United States Patent [19]
Kitano et al.

[11] Patent Number: 5,418,665
[45] Date of Patent: May 23, 1995

[54] DRIVING SECTION OF FLOPPY DISK DRIVE

[75] Inventors: Takamasa Kitano; Yuichi Hayakawa, both of Tokyo; Shinichi Saito, Gunma, all of Japan

[73] Assignee: NEC Corporation, Japan

[21] Appl. No.: 106,230

[22] Filed: Aug. 12, 1993

[30] Foreign Application Priority Data

Aug. 17, 1992 [JP] Japan .................. 4-217584

[51] Int. Cl.⁶ .............................................. G11B 5/48
[52] U.S. Cl. ..................... 360/97.01; 360/104
[58] Field of Search ................. 360/97.01–97.02, 360/104–106

[56] References Cited
U.S. PATENT DOCUMENTS 4,139,877  2/1979  Townsend ................... 360/106
4,700,095  10/1987  Kawakami ................... 360/106

Primary Examiner—John Wolff
Attorney, Agent, or Firm—Laff, Whitesel, Conte & Saret, Ltd.

[57] ABSTRACT

A floppy disk drive having a driving section provided with a spindle motor and a linear pulse motor includes a primary rail member (7) which determines a direction of movement of a reciprocating moving member (13) of the linear pulse motor and which has a plurality of V-shaped reference point cut-outs (8a, 8b) which serve as guides for reference pins (17, 18) of a jig. The spindle motor and the linear pulse motor are carried by a motor base (3) which has a plurality of holes (4a, 4b) for receiving the reference pins (17, 18). These pins are long enough to extend into the cut-outs. The holes (4a, 4b) have inner diameters which are larger than the outer diameters of the reference pins for enabling the motor base to be moved and adjusted. The arrangement enables an assembly of a floppy disk drive with high precision.

4 Claims, 4 Drawing Sheets

DRIVING SECTION OF FLOPPY DISK DRIVE

BACKGROUND OF THE INVENTION (1) Field of the Invention

The present invention relates to a driving section of a floppy disk drive, and more particularly to a driving section in which a linear pulse motor for driving a magnetic head and a spindle motor for rotating a medium or floppy disk are unitarily formed.

(2) Description of the Related Art

In recent years, there is an increasing demand for making a floppy disk drive compact and for increasing its storage capacity. In order to meet this demand, it is necessary to develop a compact and high precision driving section of the floppy disk drive. A driving section in which a stator of a spindle motor and a stator of a linear pulse motor are unitarily formed with the elements involved being precisely positioned and the structure being made thin and compact has previously been proposed (Japanese Patent Application No. H2-299,379). Such a driving section is shown in FIGS. 1A and 1B and described herein as a prior art structure.

In order to assist the understanding of the present invention, the prior art structure referred to above is first explained with reference to FIGS. 1A, 1B and also FIG. 2. As shown in FIG. 1A, a motor base 29 carries a spindle motor stator 2 and a linear pulse motor stator 6. In the center of the spindle motor stator 2 is provided with a spindle motor bearing housing 1 which passes through the motor base 29. The linear motor stator 6 carries thereon stator-side magnetic pole pieces 5. The spindle motor is arranged such that one end of a shaft 43 of a hub 41 is inserted into the bearing housing 1 together with bearings 42 and the other end of the shaft 43 is fixed by a male screw 44 at the center of the rotor 40 from the back of the motor base 29. The rotor 40 has magnetic poles which magnetically react with the spindle motor stator 2 thereby causing the rotor 40 to rotate. The rotor 40 is supported by the bearings 42 allowing it to be rotated together with the hub 41. The rotation of the hub 41 is transmitted to the medium (not shown) whereby the medium is rotated.

The linear motor stator 6 is arranged in a projected block form at a recessed portion of the motor base 29. A primary rail 30 and a retainer 10 are provided over the linear motor stator 6. The primary rail 30 is provided with a guide groove 9 at its side portion and an opening 32 at its center portion, which opening is larger than the block form stator 6. The primary rail 30 is fixed to the motor base 29. The retainer 10 has a large opening therein with four side portions being retained. The retainer 10 has rollers at one side portion and steel balls 11 at the other portion which fit in and roll along the guide groove 9 of the primary rail 30. A reciprocating moving member 13 is provided at a location corresponding to that of the stator 6. The reciprocating moving member 13 has, as in FIG. 1B which shows a back side thereof, magnetic pole pieces 26 and a guide groove 14 at its side portion. The reciprocating moving member 13 is held by the retainer 10 in such a way that the steel balls 11 on the retainer 10 fit in and roll along the guide groove 14 of the reciprocating moving member 13. The magnetic pole pieces 26 of the reciprocating moving member 13 and the magnetic pole pieces 5 of the stator 6 are kept in position with a predetermined space provided therebetween and, due to the electromagnetic action, the reciprocating moving member 13 moves backwards and forwards in the direction defined by the guide groove 9 of the primary rail 30 and the guide groove 14 of the reciprocating moving member 13. This reciprocating moving member 13 carries thereon a magnetic head 21 as shown in FIG. 2.

Since the linear pulse motor is driven due to the electromagnetic action developed between the magnetic pole pieces 26 of the reciprocating moving member 13 and the magnetic pole pieces 5 of the stator 6 as explained above, there must be sufficient precision in the parallel relationship between the pole pieces 5 and the pole pieces 26 as, otherwise, there will develop variations in the driving characteristics. Thus, such precision in the parallel relationship must be achieved during the assemblage of the primary rail 30 to the motor base 29. What has been done in the prior art for this purpose is to provide a primary rail adjusting pivot pin 27 on the motor base 29 and to provide a pivot hole 31 for receiving therein the primary rail adjusting pivot pin 27. As the primary rail 30 has at its center portion the rectangular opening 32 which is larger than the block form stator 6, the primary rail 30 is allowed to make a slight rotation with the pivot pin 27 as the axis of rotation. By this rotation, the parallel relationship between the pole pieces 5 and the pole pieces 26 is adjusted and this is followed by the fixing of the primary rail 30 to the motor base 29.

In the manner explained above, the linear pulse motor and the spindle motor are mounted on and fixed to the motor base 29 and this results in the formation of a motor module 32 as shown in FIG. 2.

Now, how the magnetic head 21 is mounted on the motor module 32 is explained with reference to FIG. 2. For this mounting operation, a magnetic head mounting jig 34 is used. This jig 34 carries a magnetic head mounting guide pin 33 and a spindle motor shaft stopper 23. In mounting the magnetic head 21 on the reciprocating moving member 13, the center of the magnetic head 21 must be located on a straight line crossing the center of the guide pin 33 and the center of the stopper 23 (that is, the location of the diametrical direction of the medium along which the magnetic head is to scan the medium). For this purpose, there is provided a magnetic head mounting reference hole 28 in the motor base 29 at a location transversely in the center and longitudinally opposite from the location of the spindle motor. This reference hole 28 receives the guide pin 33, and the sliding movement of the guide pin 33 in the direction shown in an arrow in FIG. 2 allows the spindle motor shaft 20 to be held by the stopper 23 for mounting the magnetic head 21.

With the use of the prior art motor module 32, the moving direction of the linear pulse motor does not necessary coincide with the diametrical direction of the medium. This problem results from alignment errors in various parts such as the stator 6, the primary rail 30, the retainer 10 and the reciprocating moving member 13 constituting the linear pulse motor. That is, according to the conventional assemblage explained above, although the attention has been paid to the alignment between the magnetic pole pieces 5 of the stator 6 and the magnetic pole pieces 26 of the reciprocating moving member 13 and also to the alignment between the magnetic head 21 and the spindle motor shaft 20, no consideration has been paid to the adjustment of the magnetic head 21 with respect to the moving direction of the linear pulse motor. In the conventional motor module 32, such adjustment is structurally not possible. Thus, such conventional arrangement has encountered a problem of the magnetic head deviating from the diametrical direction of the medium during the driving operation of the linear pulse motor.

SUMMARY OF THE INVENTION

It is, therefore, an object of the present invention to overcome the problems existing in the prior art and to provide a driving section of the floppy disk drive in which a stator of a spindle motor and a stator of a linear pulse motor are unitarily formed with the locations of them being exact for high precision operation of the floppy disk drive.

According to one aspect of the invention, there is provided a floppy disk drive with a driving section having a spindle motor for driving a medium and a linear pulse motor for driving a magnetic head, the spindle motor and the linear pulse motor having respectively a spindle motor stator and a linear pulse motor stator which are unitarily formed, the linear pulse motor having a reciprocating moving member to be driven by an electromagnetic force generated between the linear pulse motor stator and the reciprocating moving member, the driving section comprising:

a primary rail member which determines a direction of movement of the reciprocating moving member and which has at least two reference point cut-outs serving as guides to reference pins in determining the direction; and a motor base which carries the spindle motor and the linear pulse motor and which is provided with a plurality of holes each receiving each of the reference pins extending into the reference point cut-outs, the holes having inner diameters larger than outer diameters of the reference pins thereby allowing the motor base to be moved and adjusted.

According to the invention, it is possible to provide a driving section of the floppy disk drive in which high precision adjustment is achieved not only in the alignment between the magnetic pole pieces 5 of the stator and those of the reciprocating moving member and the alignment between the magnetic head and the spindle motor shaft, but also in the alignment or adjustment of the magnetic head with respect to the moving direction of the linear pulse motor.

BRIEF DESCRIPTION OF THE DRAWINGS

The above and other objects, features and advantages of the present invention will be apparent from the following description of a preferred embodiment of the invention explained with reference to the accompanying drawings, in which.

PREFERRED EMBODIMENT OF THE INVENTION

Figure 3:
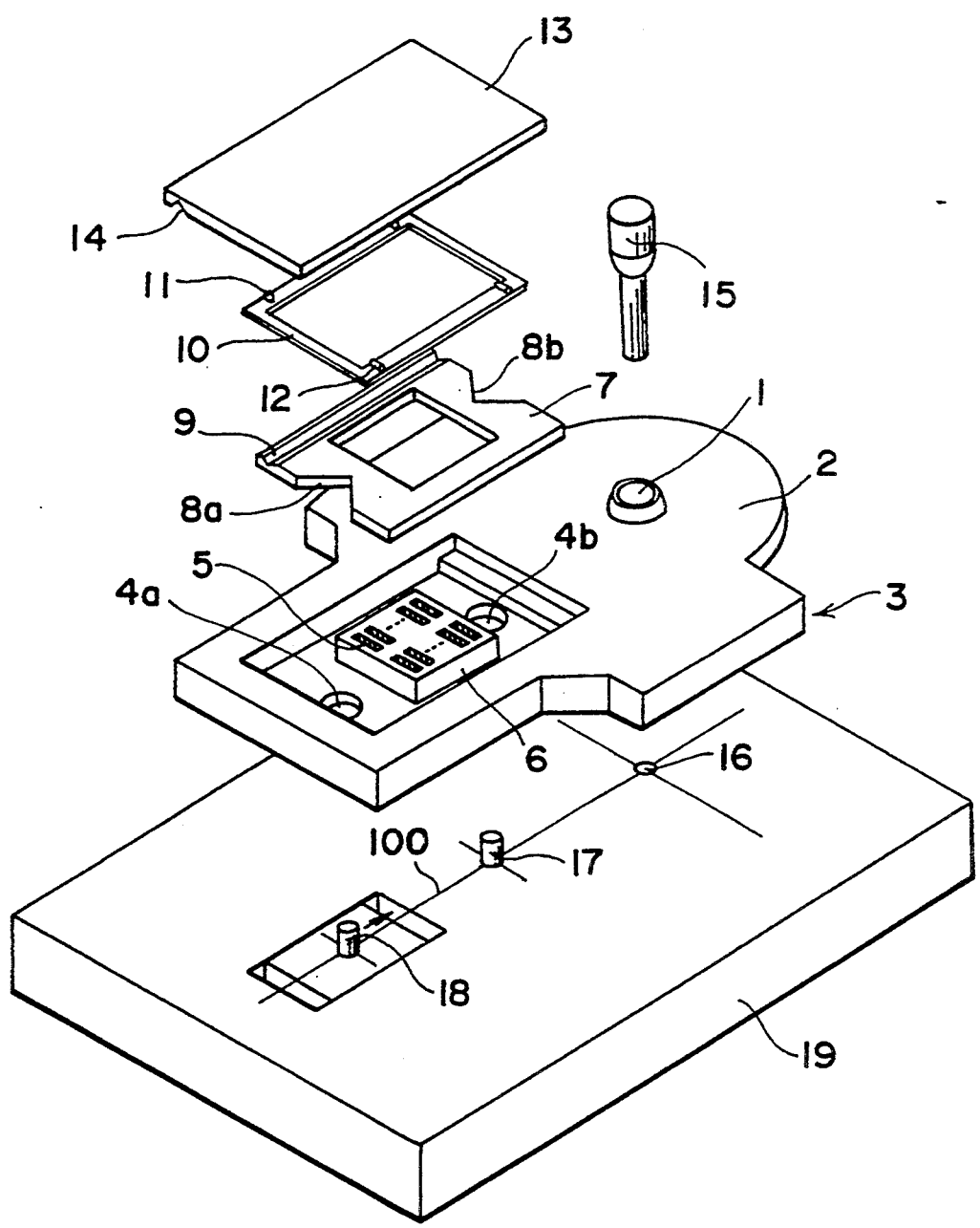
FIG. 3 is an exploded perspective view of a floppy disk drive of an embodiment according to the invention.
Figure 4:
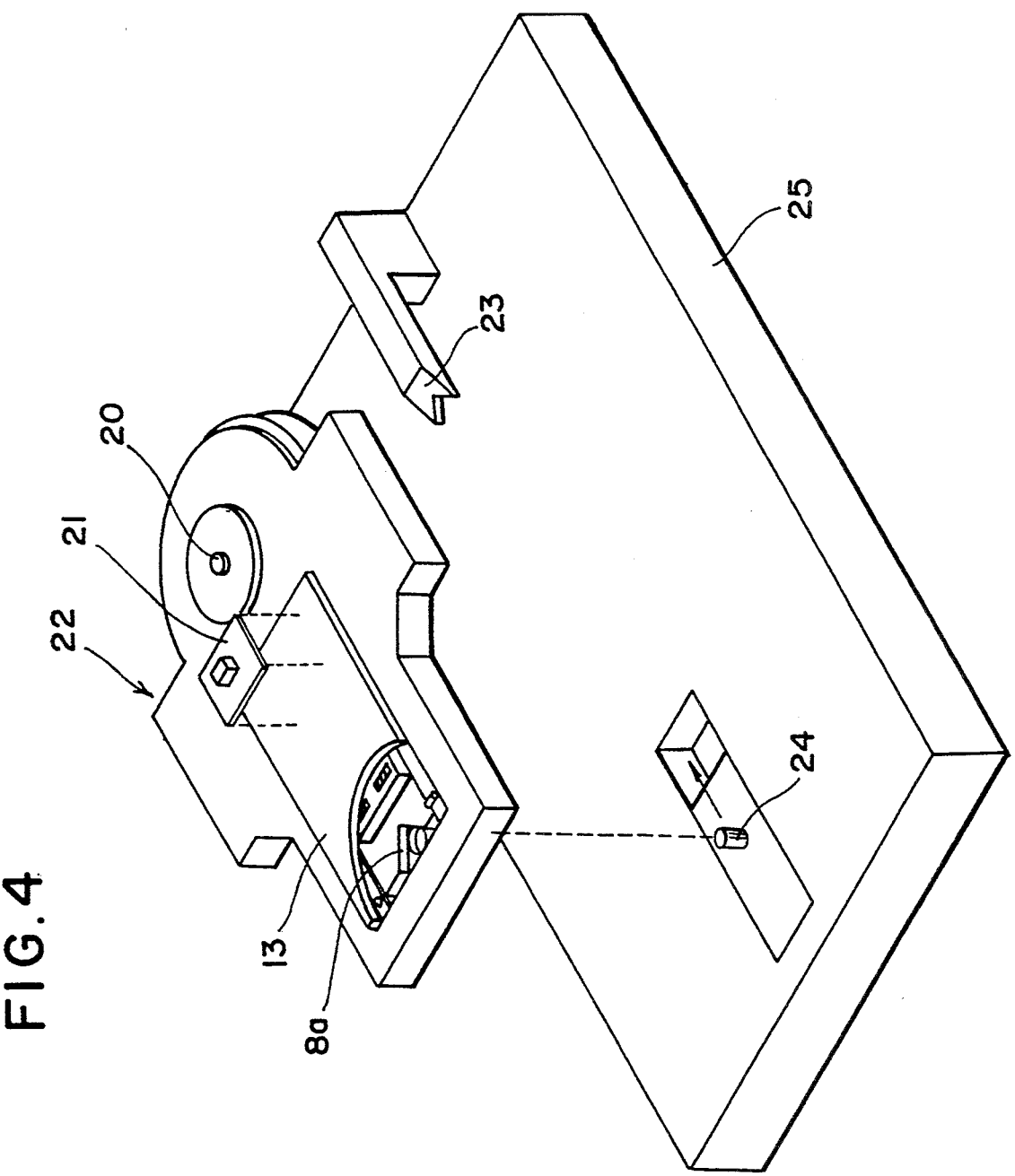
FIG. 4 is a perspective view illustrating a part of the assemblage of the floppy disk drive of the embodiment according to the invention.

Now, a preferred embodiment of the present invention will be explained with reference to FIGS. 3 and 4. It should be noted that, throughout the following explanation, similar reference symbols or numerals refer to the same or similar elements in all the figures of the drawings.

Figure 1A:
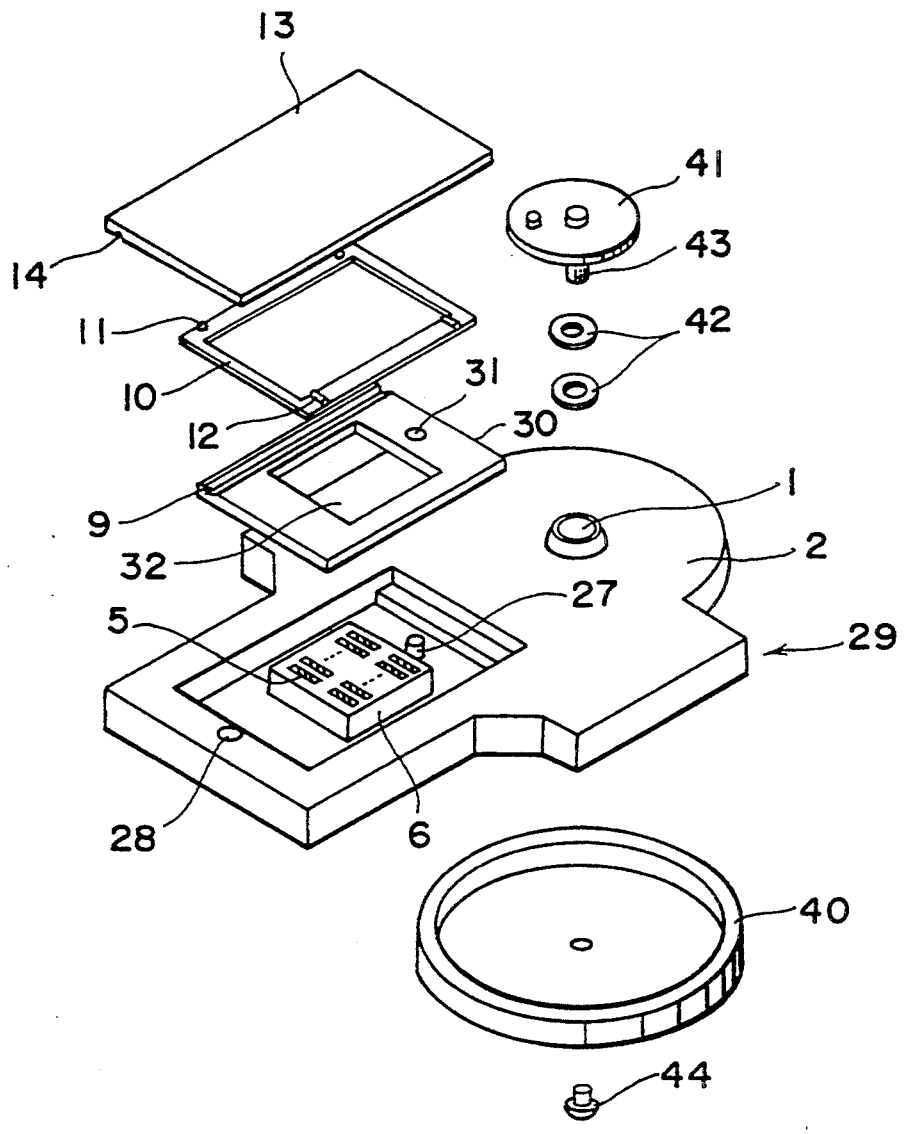
FIG. 1A is an exploded perspective view of a conventional floppy disk drive.
Figure 1B:
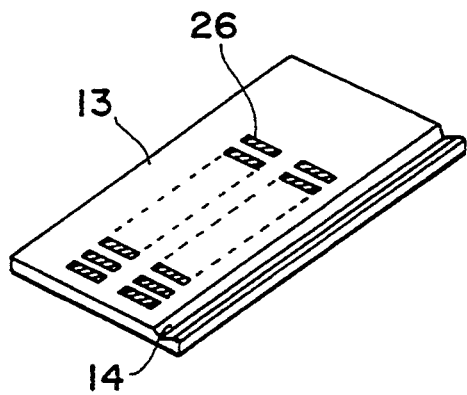
FIG. 1B is a back side perspective view of the reciprocating moving member.
Figure 2:
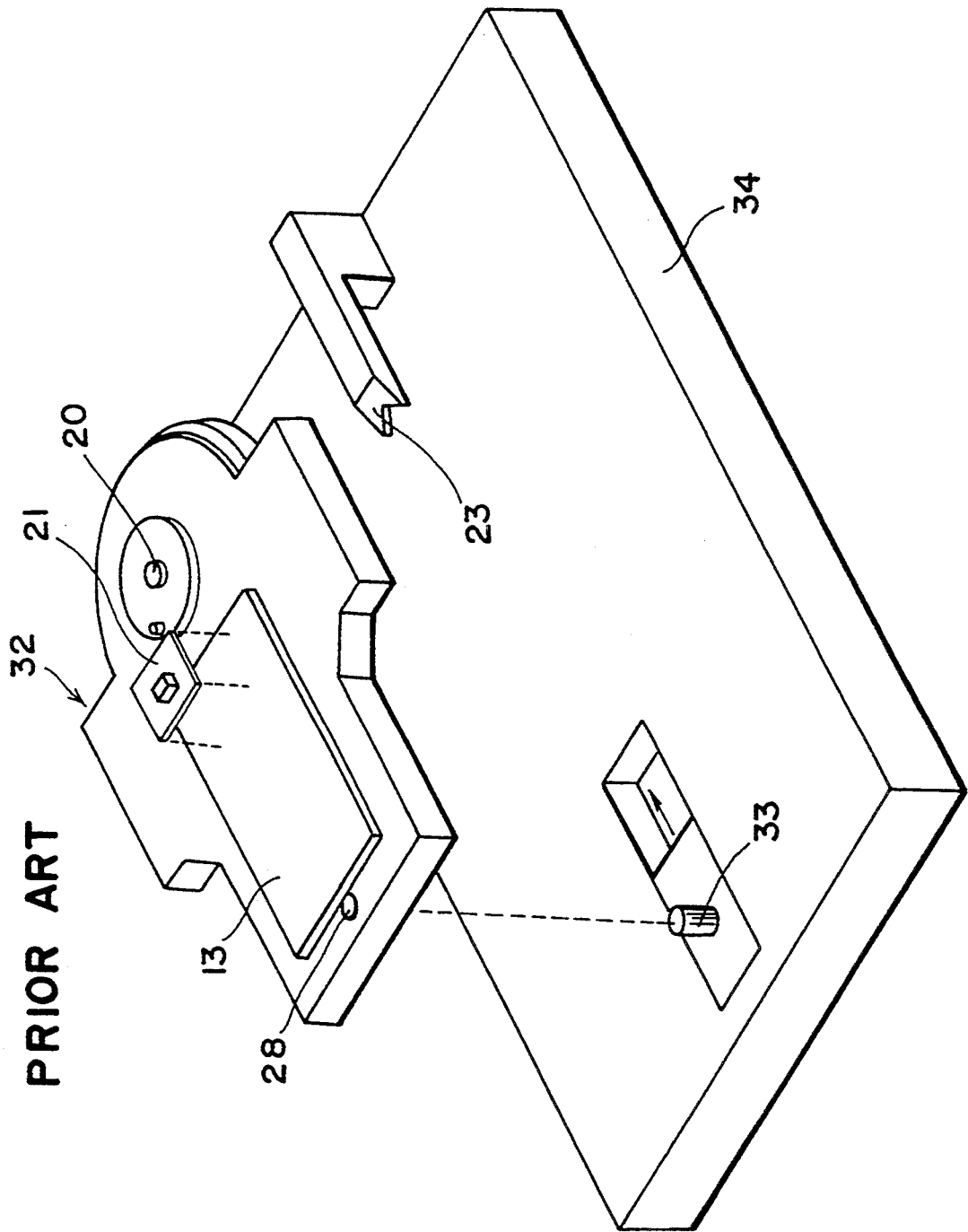
FIG. 2 is an exploded perspective view illustrating a part of the assemblage of the conventional floppy disk drive.

The present invention provides a structure wherein, when the primary rail 7 is mounted on the motor base 3, the stator magnetic pole pieces 5 are exactly aligned with the magnetic pole pieces 26 (FIG. 1) of the linear motor and the direction of the guide groove 9 of the primary rail 7 is completely parallel to the direction of the exact diametrical direction of the medium. The mounting of the magnetic head in complete agreement with the line of such diametrical direction of the medium will effectively prevent the occurrence of any displacement of the magnetic head. For this purpose, in this embodiment according to the present invention, it should be noted that the primary rail 7 is provided, at its forward and rear ends thereof, with V-shaped cut-outs 8a and 8b serving respectively as assemblage references. It is arranged that an imaginary line crossing the bottom portions of the two V-shaped cut-outs 8a and 8b is completely in parallel to the guide groove 9 of the primary rail 7. The motor base 3 is provided with, at the corresponding portions faced by the V-shaped cut-outs 8a and 8b, two rail adjusting holes 4a and 4b to be associated with the V-shaped cut-outs 8a and 8b, respectively. So far, the structural feature of the motor module according to this embodiment has been explained.

Now, how the module having the above configuration is fabricated is explained. In the assembling operation, the linear pulse motor assembling jig 19 is used. This jig 19 is provided with a spindle motor reference hole 16, a primary rail reference pin 17 and a primary rail reference pin 18 which is movable (slidable in direction of the arrow in FIG. 3). It is arranged that the centers respectively of all such hole and pins are on the common straight line. The primary rail reference pin 18 is movable along such straight line in the direction shown in an arrow in FIG. 3. The outer diameters of the pins 17 and 18 are smaller than the inner diameters of the adjusting holes 4b and 4a, respectively. In this arrangement, in order to have the spindle motor bearing housing 1 of the motor base 3 and the spindle motor reference hole 16 of the jig 19 to coincide with each other, a spindle motor centering pin 15 is inserted through them and is pressed down. In this state, the reference pins 17 and 18 extend out through the adjusting holes 4b and 4a of the motor base 3, respectively. These extended-out reference pins 17 and 18 engage with the V-shaped cut-outs 8b and 8a of the primary rail 7, respectively. When the reference pin 18 is caused to slide inwardly, the primary rail 7 is firmly and unmovably held between the two reference pins 17 and 18. In this way, it can be ensured that the guide groove 9 of the primary rail 7 is always positioned in parallel with the imaginary reference line crossing the reference hole 16, the reference pin 17 and the reference pin 18. Since the adjusting holes 4b and 4a are larger than the diameters of the reference pins 17 and 18, respectively, the motor base 3 is free to make a slight rotation with respect to the jig 19 with the reference hole 16 as the axis of rotation. This rotation results in the exact aligning of the magnetic pole pieces 26 of the reciprocating moving member 13 with the magnetic pole pieces 5 of the stator 6. Upon being aligned, the primary rail 7 and the motor base 3 are fastened and fixed together in their aligned state. Through these operations, the magnetic pole pieces 26 of the reciprocating moving member 13 and the magnetic pole pieces 5 of the stator 6 of the linear pulse motor are aligned in their exact positions and the moving direction of the linear motor is adjusted to follow the reference line 100.

Next, how the magnetic head is mounted on the reciprocating moving member 13 is explained with reference to FIG. 4. Although the method used is similar to that used in the prior art, it differs in the point wherein, according to the invention, the magnetic head mounting guide pin 24 goes through the adjusting hole 4a and supports the assemblage reference cut-out 8a. The magnetic head mounting jig 25 has a magnetic head mounting guide pin 24 and a spindle motor shaft stopper 23, and the magnetic head is mounted on the line crossing them with the center of the magnetic head being positioned exactly on the line. In this way, the line crossing the guide pin 24 and the stopper 23 precisely coincides with the reference line 100. Since the center of the magnetic head 21 is positioned on such line, it follows that the magnetic head 21 always scans along this reference line 100 so that there does not occur any deviation or displacement between the magnetic head and the medium. The expression "center of the magnetic head" used herein refers to a location of the magnetic head which is 0.35 mm away from the magnetic head gap (in the cass of 3.5 inch floppy disk).

While the invention has been described in its preferred embodiment, it is to be understood that the words which have been used are words of description rather than limitation and that changes within the purview of the appended claims may be made without departing from the true scope and spirit of the invention in its broader aspects.

What is claimed is:

1. A floppy disk drive with a driving section having a spindle motor means for driving a medium and a linear pulse motor means for driving a magnetic head, said spindle motor means and said linear pulse motor means having respectively a spindle motor means stator and a linear pulse motor means stator which are unitarily formed, said linear pulse motor means having a reciprocating moving member which is driven by an electromagnetic force generated between said linear pulse motor means stator and said reciprocating moving member, said driving section comprising:

a plurality of reference pins;

a primary rail member which determines a direction of movement of said reciprocating moving member and which has at least two reference point cut-outs serving as guides for said plurality of reference pins in determining said direction; and a motor base carries said spindle motor means and said linear pulse motor means and has a plurality of holes, each of said holes receiving an individually associated one of said reference pins, said pins extending into said reference point cut-outs, said holes having inner diameters which are larger than outer diameters of said reference pins for allowing said motor base to be moved and adjusted.

2. A floppy disk drive according to claim 1, in which one of said reference pins is movable towards the other of said reference pins, extends through one of said into and holds one of said reference point cut-outs.

3. A floppy disk drive according to claim 1, in which each of said reference point cut-outs has a V-shaped cut-out.

4. A floppy disc drive according to claim 1, in which said spindle motor has its axle of rotation located on and centered upon an extension of a line crossing said reference point cut-out.

* * * * *